US009658504B2

(12) United States Patent
Lu et al.

(10) Patent No.: US 9,658,504 B2
(45) Date of Patent: May 23, 2017

(54) DISPLAY PANEL HAVING A LIGHT SHIELDING LAYER OVERLAPPED EVEN NUMBER OF SOURCE LINES AND A GATE LINE

(71) Applicant: Innolux Corporation, Chu-Nan (TW)

(72) Inventors: Yung-Hsin Lu, Chu-Nan (TW); Cheng-Min Wu, Chu-Nan (TW); Ming-Yo Chiang, Chu-Nan (TW); Jyun-Yu Chen, Chu-Nan (TW)

(73) Assignee: INNOLUX CORPORATION, Chu-Nan (TW)

( * ) Notice: Subject to any disclaimer, the term of this patent is extended or adjusted under 35 U.S.C. 154(b) by 307 days.

(21) Appl. No.: 14/598,566

(22) Filed: Jan. 16, 2015

(65) Prior Publication Data

US 2015/0205176 A1    Jul. 23, 2015

(30) Foreign Application Priority Data

Jan. 17, 2014    (TW) .............................. 103101783 A

(51) Int. Cl.
*G02F 1/136*    (2006.01)
*G02F 1/1362*    (2006.01)
*G02F 1/1368*    (2006.01)

(52) U.S. Cl.
CPC ................. *G02F 1/136209* (2013.01); *G02F 2001/13685* (2013.01)

(58) Field of Classification Search
CPC ......... G02F 1/136209; G02F 1/133512; G02F 1/136227; H01L 29/78633; H01L 27/1214; H01L 29/78648; H01L 27/3272; Y10S 438/977
USPC ............................................. 349/42–44, 110
See application file for complete search history.

(56) References Cited

U.S. PATENT DOCUMENTS

| 6,268,895 B1* | 7/2001 | Shimada ........... G02F 1/133512 349/110 |
| 2001/0035919 A1* | 11/2001 | Zhang ................ H01L 27/1255 349/44 |
| 2008/0117370 A1* | 5/2008 | Sumi .................... G02F 1/13394 349/110 |
| 2008/0151151 A1* | 6/2008 | Fujikawa .......... G02F 1/136227 349/106 |

* cited by examiner

Primary Examiner — Huyen Ngo
(74) Attorney, Agent, or Firm — Rabin & Berdo, P.C.

(57) ABSTRACT

A display panel comprising a substrate, a plurality of gate lines, source lines, semiconductor layers and light shielding layers is provided. The gate lines are disposed on the substrate in parallel. The source lines are disposed on the substrate in parallel. The gate lines and the source lines are intercrossed to define a plurality of pixel areas. The semiconductor layers are disposed on the corresponding pixel areas, and each semiconductor layer includes at least one channel region overlapping each gate line. The slight shielding layers are located between the channel regions and the substrate. In a normal direction of the substrate, one of the gate lines is overlapped by two of the light shielding layers, and one of the light shielding layers overlaps even number of the source lines.

10 Claims, 5 Drawing Sheets

DISPLAY PANEL HAVING A LIGHT SHIELDING LAYER OVERLAPPED EVEN NUMBER OF SOURCE LINES AND A GATE LINE

This application claims the benefit of Taiwan application Serial No. 103101783, filed Jan. 17, 2014, the subject matter of which is incorporated herein by reference.

BACKGROUND OF THE INVENTION

Field of the Invention

The invention relates in general to a display panel, and more particularly to a display panel with specific arrangement of light shielding layers.

Description of the Related Art

Along with the rapid advance in the display technology, high-resolution display capable of processing digital signals and displaying more pixel details has gradually become a main stream product.

A conventional display panel is driven by top-gate thin film transistors (TFT). Based on such design, gate electrodes are disposed above an active layer, and a light shielding layer is disposed in the panel to avoid a backlight source directly radiating on the active layer and generating photo leakage. However, when the display panel is driven, the light shielding layer is easily coupled with the signals of source lines and causes the separation of I-V curve in TFT. Therefore, the gate voltage difference ($\Delta Vg=Vgh-Vgl$) between the gate voltage in a turn-on state (Vgh) and the gate voltage in a turn-off (Vgl) state needs to be increased to avoid current leakage. However, as the load required by the TFT is increased, the lifespan of components will be reduced.

SUMMARY OF THE INVENTION

The invention is directed to a display panel used in a high-resolution display. The display panel has a specific arrangement of light shielding layers and is capable of increasing electrical properties of components.

According to one embodiment of the present invention, a display panel is provided. The display panel comprises a substrate, a plurality of gate lines, a plurality of source lines, a plurality of semiconductor layers and a plurality of light shielding layers. The gate lines are disposed on the substrate in parallel. The source lines are disposed on the substrate in parallel. The gate lines and the source lines are intercrossed to define a plurality of pixel areas. The semiconductor layers are disposed on the corresponding pixel areas, and each semiconductor layer includes at least one channel region overlapping each gate line. The light shielding layers are located between the channel regions and the substrate. In a normal direction of the substrate, one of the gate lines is overlapped by two of the light shielding layers, and one of the light shielding layers overlaps even number of the source lines.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
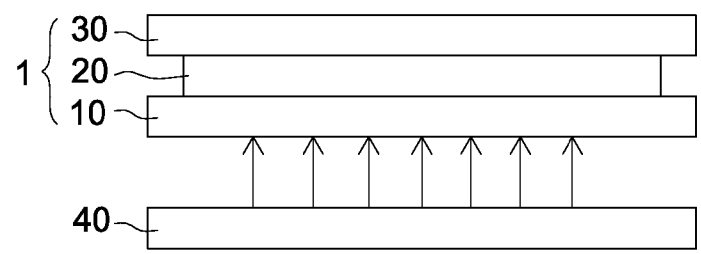
FIG. 1 is a schematic diagram of a display panel according to an embodiment of the invention.

A number of embodiments are disclosed below with accompanying drawings for elaborating the invention. It should be noted that the drawings are simplified so as to provide clear descriptions of the embodiments of the invention, and the scales used in the drawings are not based on the scales of actual products. However, the embodiments of the invention are for detailed descriptions only, not for limiting the scope of protection of the invention.

Referring to FIG. 1, a schematic diagram of a display panel according to an embodiment of the invention is shown. The display panel 1 includes a first substrate 10, a liquid crystal layer 20 and a second substrate 30. The first substrate 10 can be a thin-film transistor (TFT) substrate. The liquid crystal layer 20 is located between the first substrate 10 and the second substrate 30, and the transmittance of the liquid crystal layer 20 can be changed when the liquid crystal layer 20 is driven by a voltage. The second substrate 30 is opposite to the first substrate 10, and can be realized by such as a color filter substrate, which enables the display panel 1 to display colors. In some embodiments, the color filter can be disposed on the second substrate 30. Such structure is referred as a color filter on array (COA) substrate. Since the display panel 1 is not self-luminous, the display panel 1 can be equipped with a backlight module 40 which provides a light source. In other embodiment, the display panel can be self-luminous, such as organic electroluminesence display. In such embodiment, the liquid crystal layer and the backlight module are no needed anymore.

Figure 2A:
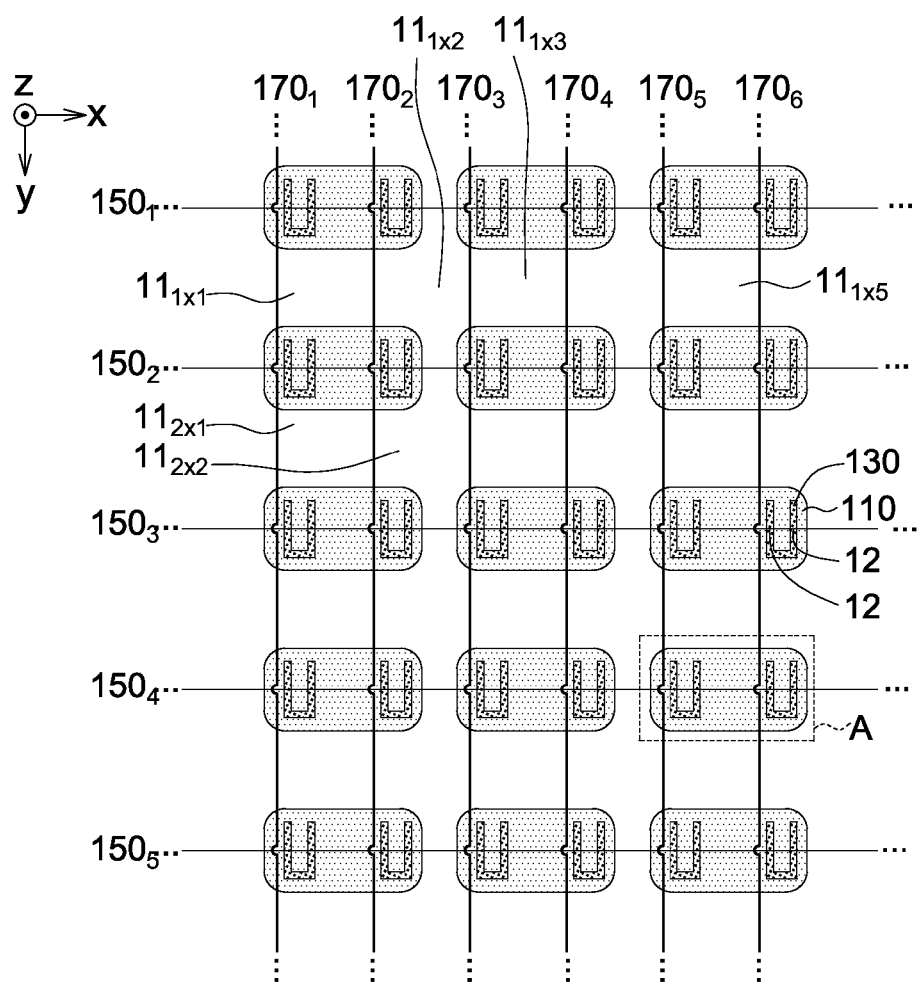
FIG. 2A is a top view of a TFT substrate according to an embodiment of the invention.

Referring to FIG. 2A, a top view of a TFT substrate according to an embodiment of the invention is shown. The TFT substrate 10, being a main component of the display panel 1, comprises a plurality of gate lines $150_1$-$150_5$, and a plurality of source lines $170_1$-$170_6$. The gate lines $150_1$-$150_5$ are arranged in parallel at an equal interval and extended along a first direction. The source lines $170_1$-$170_6$ are also arranged in parallel at an equal interval and extended along a second direction. The first direction is orthogonal to the second direction. A plurality of pixel areas 11 are defined by the intercrossed gate lines $150_1$-$150_5$ and source lines $170_1$-$170_6$ on the TFT substrate 10. Each pixel area corresponds to a pixel on the display panel 1, and the number of pixels per unit area is referred as resolution represented by pixels per inch (PPI).

Figure 2B:
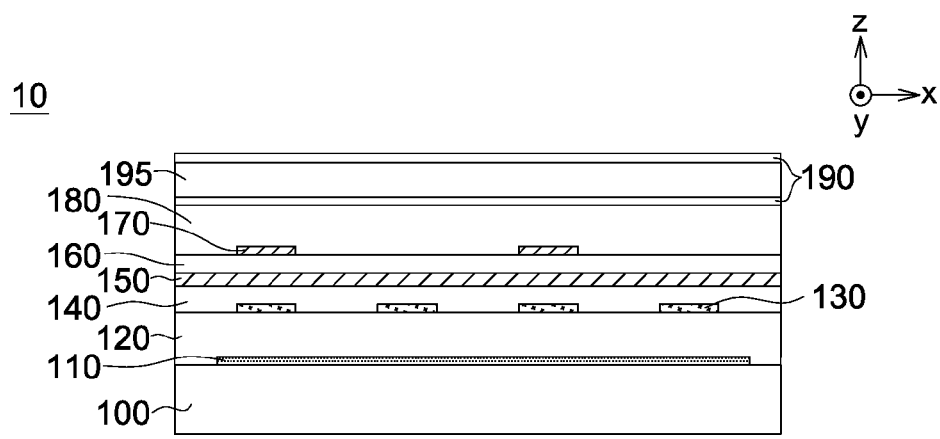
FIG. 2B is a cross-sectional view of the TFT substrate of FIG. 2A.

FIG. 2A and FIG. 2B illustrate detailed structures of the TFT substrate 10. FIG. 2B is a cross-sectional view of the TFT substrate of FIG. 2A along a gate line. Here, the cross-section is exemplified by a cross-section along a gate line $150_4$ in a dotted box A. The TFT substrate 10 includes a base plate 100, a plurality of light shielding layers 110, a first insulating layer 120, a semiconductor layers 130, a second insulating layer 140, a plurality of gate lines 150, a third insulating layer 160, a plurality of source lines 170, a planarization layer 180, two transparent electrodes 190 and a fourth insulating layer 195. The light shielding layers 110 are floating on the base plate 100 and arranged along an extending direction of the gate lines 150 (the extending direction is a first direction being the X-axial direction). In some embodiments, the light shielding layers 110 can also be coupled to the gate lines 150. Any gate line 150 is overlapped by more than two mutually isolated light shielding layers 110 (for example, at least three mutually isolated light shielding layers 110 are exemplified in the FIG. 2A, and the number of light shielding layers 110 overlapping any gate line 150 may vary along the size of the panel). Any light shielding layer 110 overlaps two of the source lines (such as source lines $170_1$ and $170_2$ of FIG. 2A). Here, overlapping refers to the light shielding layers 110 overlapping the gate lines 150 or the light shielding layers 110 overlapping the source lines 170 in a normal direction of the substrate 100 (the normal direction is the Z-axial direction). The light shielding layers 110 can be made of a material having low transmittance, such as metal or amorphous silicon, to avoid the backlight on the other side of the base plate 100 directly radiating the circuit structure. The first insulating layer 120 is located on the light shielding layers 110, and the semiconductor layer 130 is located on the first insulating layer 120. In other words, the first insulating layer 120 separates the light shielding layers 110 from the semiconductor layer 130. In the present embodiment, the first insulating layer 120 can be realized by a single-layer or multi-layer structure, and the invention does not have particular restrictions regarding the number of layers.

As indicated in FIG. 2A and 2B, the second insulating layer 140 is located on the semiconductor layers 130, and the gate lines 150 are located on the second insulating layer 140. In other words, the second insulating layer 140 separates the semiconductor layers 130 from the gate lines 150. Each semiconductor layer 130 includes at least one channel region 12 overlapping the gate lines 150 (FIG. 2A). The gate line 150 is used as a gate electrode of a transistor, and the semiconductor layer 130 is used as an active layer of the transistor. A transistor whose gate electrode is located above the active layer is referred as a top-gate transistor. The semiconductor layers 130 of FIG. 2A are disposed on the TFT substrate 10 in a U-shape. Therefore, each semiconductor layer 130 includes two parts (that is, two channel regions 12) overlapping the gate line 150. In other words, each pixel area 11 includes two channel regions 12. The U-shaped arrangement of the semiconductor layers 130 is space-saving such that more pixel areas can be defined on the TFT substrate 10. In comparison to L-shaped arrangement of semiconductor layers, the U-shaped arrangement of semiconductor layers adopted in the TFT substrate 10 of the present embodiment increases the resolution of the display panel 1.

As indicated in FIG. 2A and 2B, the third insulating layer 160 is located above the gate lines 150, and the source lines 170 are located above the third insulating layer 160. In other words, the third insulating layer 160 separates the gate lines 150 from the source lines 170. Also, in the TFT substrate 10, a planarization layer 180 can be disposed on the source lines 170 such that the transparent electrodes 190 can be easily disposed on the planarization layer 180.

Figure 2C:
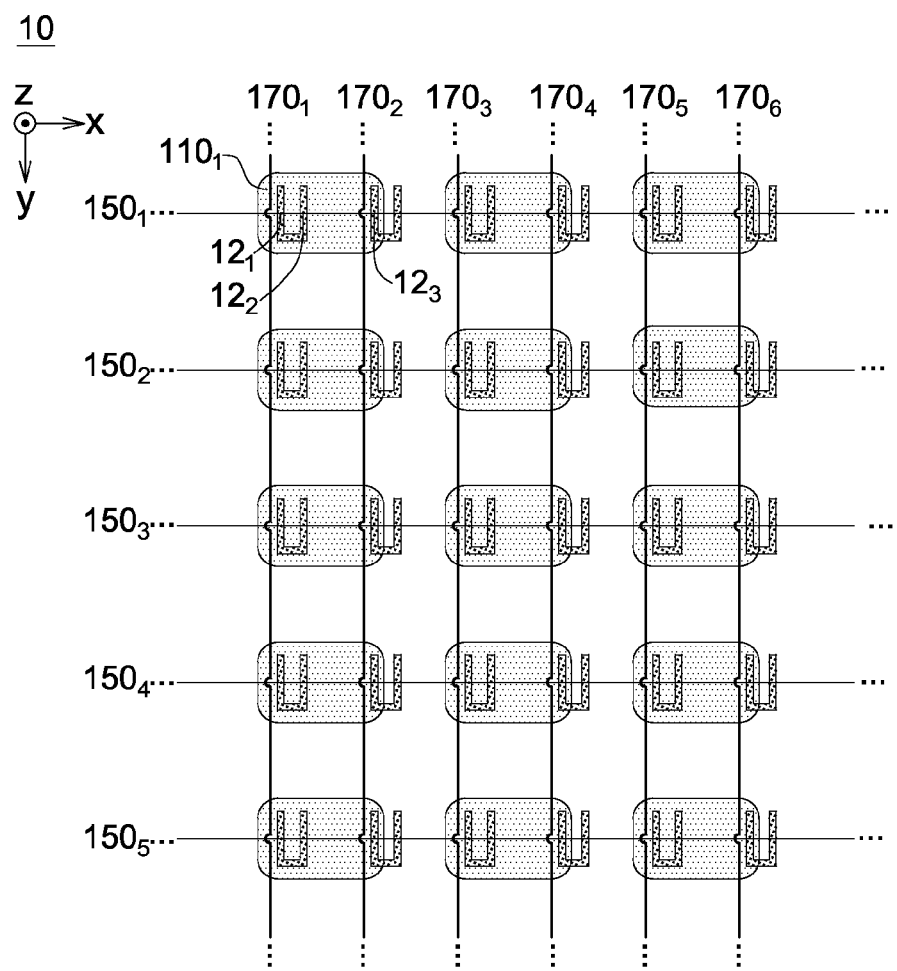
FIG. 2C is a variation of the TFT substrate of FIG. 2A.

In the TFT substrate 10, each source line provides a data signal to the corresponding semiconductor layer by way of polarity inversion such as column inversion or dot inversion. According to the column inversion driving mode, the data signal applied to one source line has positive polarity, and data signal applied to the adjacent source line has negative polarity. For example, the source lines $170_1$, $170_3$ and $170_5$ receive data signal with positive polarity, while the source lines $170_2$, $170_4$ and $170_6$ receive data signal with negative polarity. According to the dot inversion driving mode, adjacent TFTs in pixel areas 11 are driven by data signal with different polarities. For example, pixel areas $11_{1\times1}$ and $11_{2\times2}$ are driven by data signal with positive polarity, while pixel areas $11_{1\times2}$ and $11_{2\times1}$ are driven by data signal with negative polarity. In both the column inversion driving mode and the dot inversion driving mode, adjacent TFTs in pixel areas located on the same column (here, the direction of a gate line is the X-axial direction) are driven by data signal with different polarities. For example, pixel areas $11_{1\times1}$ and $11_{1\times3}$ are driven by data signal with positive polarity, while pixel area $11_{1\times2}$ is driven by data signal with negative polarity. In the TFT substrate 10 of the present embodiment, each light shielding layer 110 overlaps two of the source lines 170 so as to offset the coupling effect between the source lines 170 and the light shielding layer 110 and reduce the gate voltage difference ($\Delta Vg=Vgh-Vgl$) between the gate voltage in a turn-on state (Vgh) and the gate voltage in a turn-off (Vgl) state. Thus, the transistors can be driven with smaller loading and the lifespan of the transistors can be increased. It is noted that each light shielding layer 110 of FIG. 2A shields two semiconductor layers in adjacent pixel areas. That is, each light shielding layer 110 shields 4 channel regions 12 (each U-shaped semiconductor layers includes two channel regions). However, each light shielding layer may shield only two of the source lines 170 and does not have to extend to shield four channel regions 12. Refer to FIG. 2C. The light shielding layer $110_1$ shields two of the source lines $170_1$ and $170_2$, but only shields three channel regions $12_1$, $12_2$ and $12_3$.

It is noted that the arrangement of light shielding layers in the TFT substrate of the invention is not limited to the disclosed exemplification, and any types of arrangement would do as long as each light shielding layer overlaps an even number of source lines. Other arrangements of light shielding layers are disclosed in FIGS. 3-5.

Figure 3:
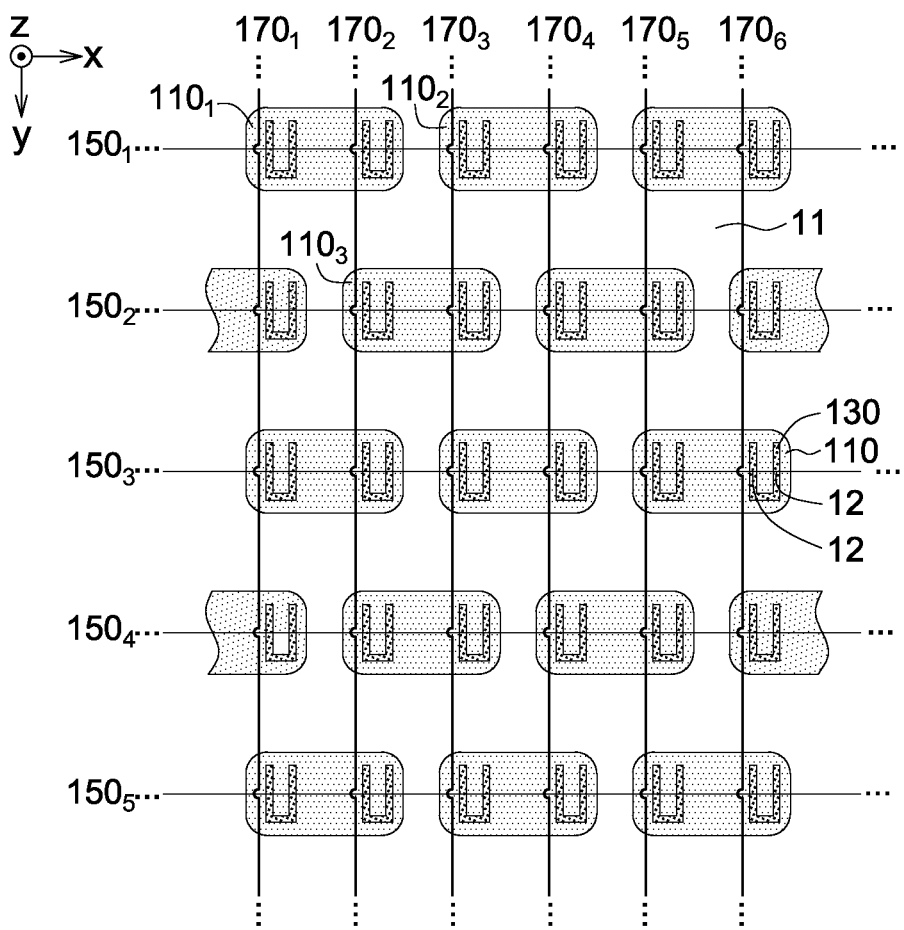
FIG. 3 is a top view of a TFT substrate according to another embodiment of the invention.

Referring to FIG. 3, a top view of a TFT substrate according to another embodiment of the invention is shown. The TFT substrate 20 is different from the disclosed TFT substrate 10 in that the light shielding layers 110 overlapping different gate lines 150 are arranged by way of displacement with respect to one source line. That is, the light shielding layers are not aligned in the second direction. For example, the light shielding layer $110_1$ overlapping the gate line $150_1$ overlaps the source lines $170_1$ and $170_2$. Relatively, the light shielding layer $110_3$ overlapping the gate line $150_2$ overlaps the source lines $170_2$ and $170_3$. The light shielding layers $110_1$ and $110_3$ are not aligned with each other in the second direction. Instead, the slight shielding layers $110_1$ and $110_3$ are arranged by way of displacement at an interval of one source line 170.

Figure 4:
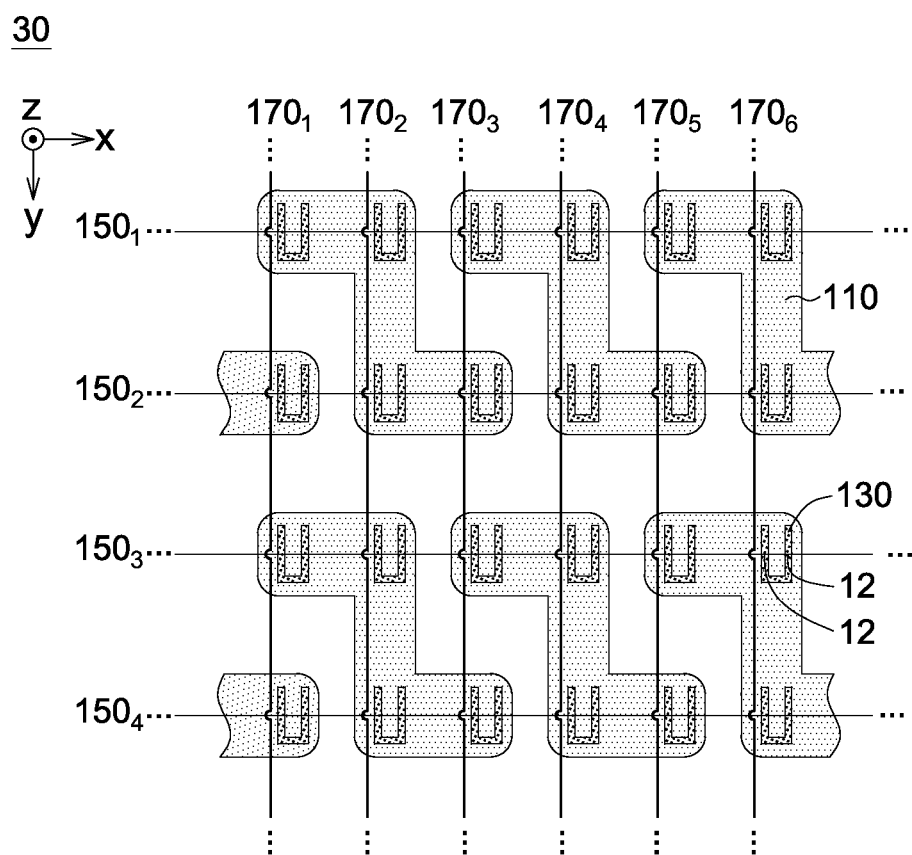
FIG. 4 is a top view of a TFT substrate according to an alternate embodiment of the invention.

Referring to FIG. 4, a top view of a TFT substrate according to an alternate embodiment of the invention is shown. The TFT substrate 30 is different from the disclosed TFT substrates in that the light shielding layers 110 overlapping different gate lines 150 can be integrated as a whole. For example, the light shielding layer overlapping the gate line $150_1$ is integrated with the light shielding layer overlapping the gate line $150_2$, and the light shielding layer overlapping the gate line $150_3$ is integrated with the light shielding layer overlapping the gate line $150_4$, such that the light shielding layers 110 are arranged in a Z-shape. Each Z-shaped light shielding layer 110 shields the source lines 170 in four adjacent pixel areas 11. Regardless the driving mode of the TFT being dot inversion or column inversion, the coupling effect between the light shielding layers 110 and the source lines 170 can be offset and display quality can be increased. It is noted that the invention does not restrict the shape of the light shielding layers. In some embodiments, the light shielding layers can also be extended towards other directions to form a mesh structure, and the coupling effect between the light shielding layers and the source lines can be reduced and display quality can be increased as long as the light shielding layers overlap even number of the source lines.

Figure 5:
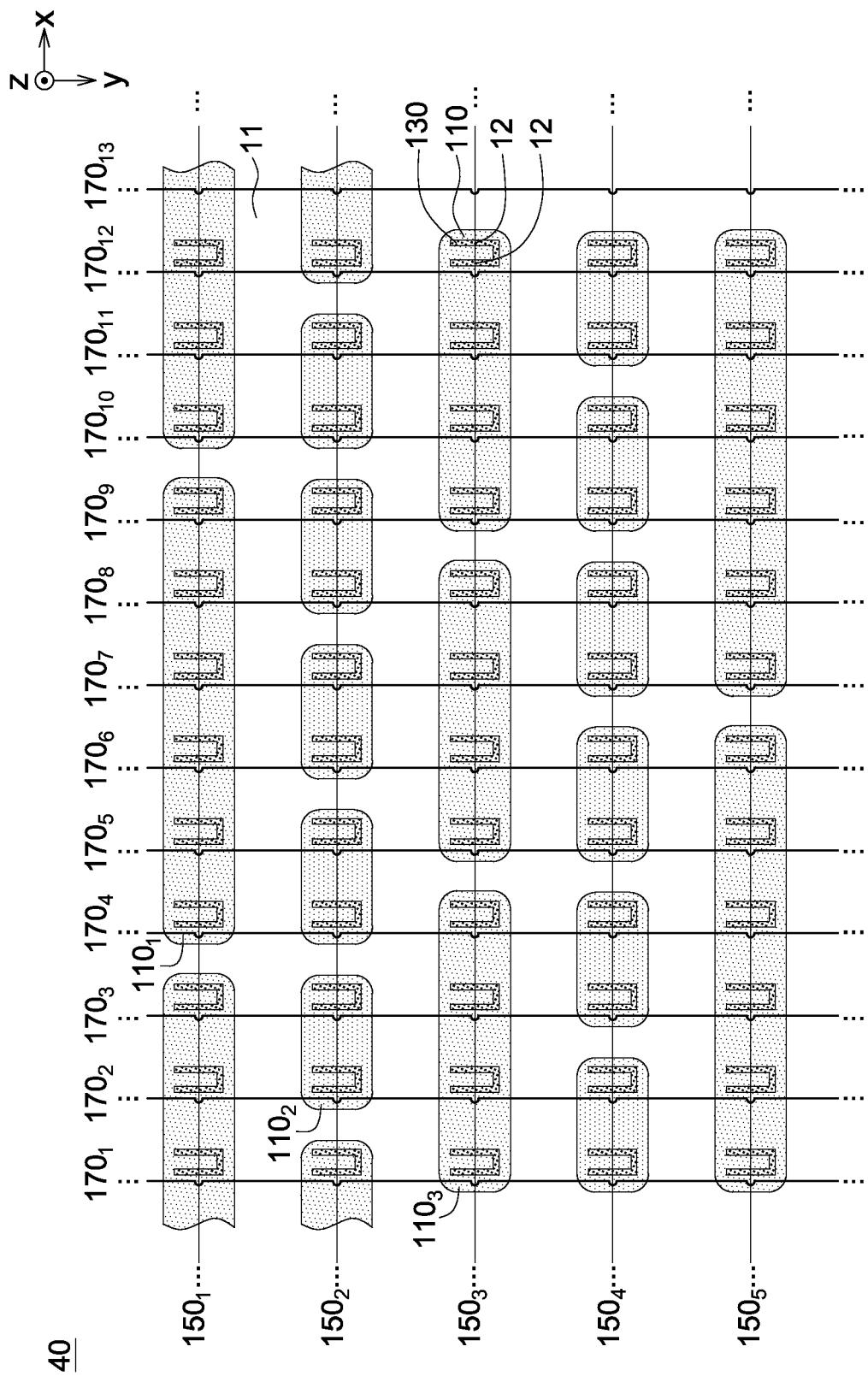
FIG. 5 is a top view of a TFT substrate according to another alternate embodiment of the invention.

Referring to FIG. 5, a top view of a TFT substrate according to another alternate embodiment of the invention is shown. The TFT substrate 40 is different from the disclosed embodiment in that the number of source lines 170 shielded by the light shielding layers 110 is not identical. For example, the light shielding layer $110_1$ overlapping the gate line $150_1$ shields six source lines ($170_4$-$170_9$), that is, 12 channel regions 12 are shielded. The light shielding layer $110_2$ overlapping the gate line $150_2$ shields two source lines ($170_2$-$170_3$), that is, four channel regions 12 are shielded. The light shielding layer $110_3$ overlapping the gate line $150_3$ shields four source lines ($170_1$-$170_4$), that is, eight channel regions 12 are shielded. When the display panel is driven, the data signal provided by the source lines 170 in adjacent pixel areas 11 will have opposite polarities. Therefore, as long as each light shielding layer can shield an even number of the source lines (for example, 2, 4, 6, 8 . . . source lines), the data signal with positive polarity and the data signal with negative polarity perceived by the light shielding layers 110 will offset each other, such that the coupling effect between the light shielding layers 110 and the source lines 170 can be offset and display quality can be increased.

According to the display panel of the disclosed embodiment, each light shielding layer shields an even number of the source lines, such that the coupling effect between the light shielding layers and the source lines can be offset, the transistors can be driven with smaller loading, and the lifespan of the transistors can be increased.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
a substrate;
a plurality of gate lines disposed on the substrate in parallel;
a plurality of source lines disposed on the substrate in parallel, wherein the gate lines and the source lines are intercrossed to define a plurality of pixel areas;
a plurality of semiconductor layers disposed on the corresponding pixel areas, wherein each semiconductor layer includes at least one channel region overlapping each gate line; and
a plurality of light shielding layers located between the channel regions and the substrate;
wherein, in a normal direction of the substrate, one of the gate lines is overlapped by two of the light shielding layers, and one of the light shielding layers overlaps even number of the source lines.

2. The display panel according to claim 1, wherein two of the gate lines are respectively overlapped by two of the light shielding layers, and the two light shielding layers are arranged by way of displacement with respect to one of the source lines.

3. The display panel according to claim 1, wherein the number of the source lines overlapped by one of the light shielding layers is different from the number of the source lines overlapped by another one of the light shielding layers.

4. The display panel according to claim 1, wherein one of the light shielding layers overlaps two of the gate lines.

5. The display panel according to claim 1, wherein each of the source lines provides a data signal to the corresponding semiconductor layer respectively, and the data signal provided by two of the source lines which are adjacent to each other have a positive polarity and a negative polarity respectively.

6. The display panel according to claim 5, wherein the number of source lines overlapped by one of the light shielding layers providing data signals with positive polarity is equal to the number of source lines overlapped by the same light shielding layer providing data signals with negative polarity.

7. The display panel according to claim 1, wherein one of the semiconductor layers includes two channel regions overlapping one of the gate lines.

8. The display panel according to claim 1, wherein one of the light shielding layers overlaps $4n$ adjacent channel regions, and n is a positive integer greater than 0.

9. The display panel according to claim 1, wherein one of the light shielding layers overlaps $3n$ adjacent channel regions, and n is a positive integer greater than 0.

10. The display panel according to claim 1, wherein the display panel is driven by way of dot inversion or column inversion.

* * * * *